Nov. 24, 1936.   E. E. DRAPER   2,061,729
APPARATUS FOR MAKING STEREOSCOPIC POSITIVES FROM NEGATIVES
Original Filed April 24, 1931
Fig.3.
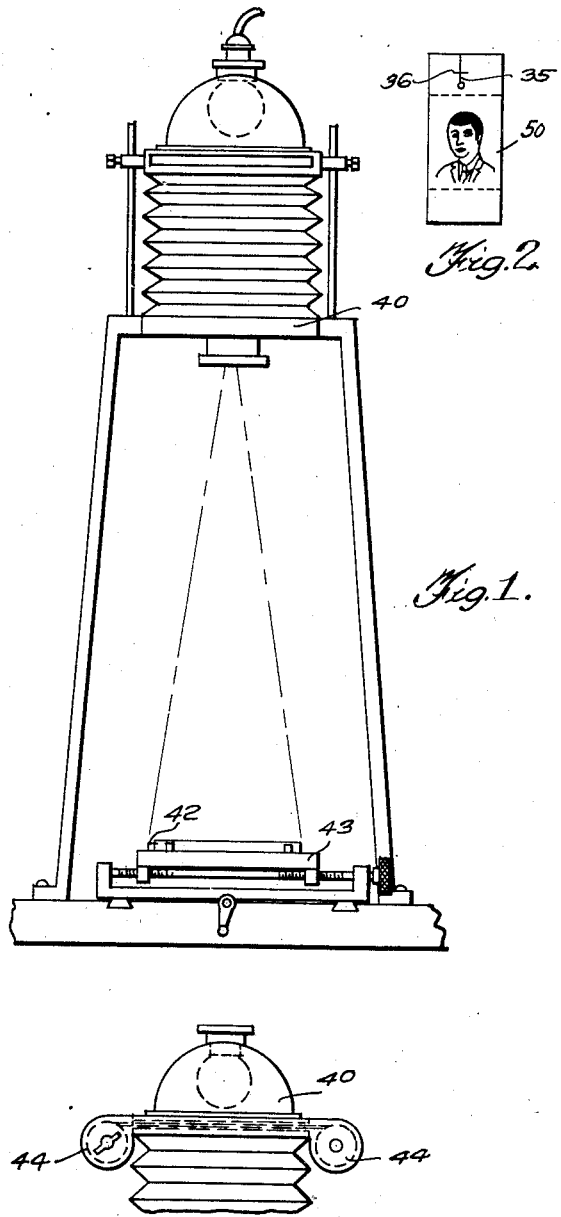
Fig.1.
Fig.2.
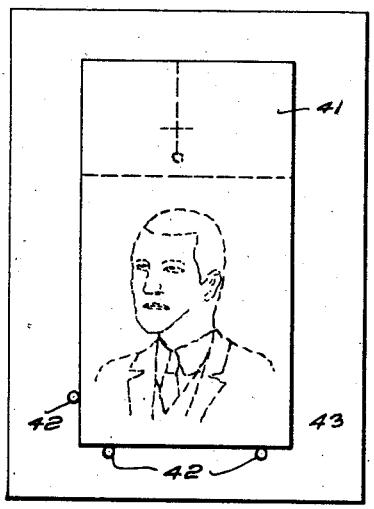
Fig.4.
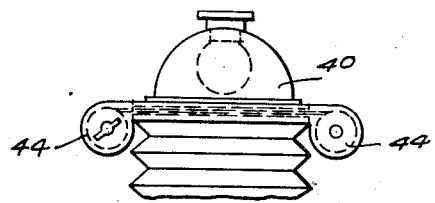
Fig.5.
INVENTOR.
BY   Ernest E. Draper
Harvey Lea Dodson
ATTORNEY.

Patented Nov. 24, 1936

2,061,729

UNITED STATES PATENT OFFICE 2,061,729

APPARATUS FOR MAKING STEREOSCOPIC POSITIVES FROM NEGATIVES

Ernest E. Draper, Scarsdale, N. Y., assignor to The Perser Corporation, New York, N. Y., a corporation of New York Application April 24, 1931, Serial No. 532,522
Renewed March 16, 1936

14 Claims. (Cl. 88—24)

My invention relates to stereoscopic photography, and especially to the production of composite pictures from pictures taken by that class of cameras such as are described in my copending application, Serial No. 532,523. That application describes apparatus in which a multiplicity of cameras are arranged in the arc of a circle about the object to be photographed. The cameras are equipped with matched lenses of equal focal depth and exposures made therethrough, preferably simultaneously. In one procedure the plates are exposed in the cameras and then developed and returned to the same cameras and projected through a line screen onto a sensitized plate or film to form a composite positive. In this procedure it is necessary that each negative be returned to its original relation with the optical system in making the composite positive. The composite positive thus obtained contains the individual views of the object, taken in the cameras from slightly different points of view, interlineated with each other.

An object of my present invention is to provide means to ensure correct projection of the individual pictures to form the composite picture without necessitating the return of the individual pictures to their respective cameras.

Briefly, this is accomplished by placing a plumb bob or other suitable registration marker at the center of the circle formed by the taking cameras, that is, at the center of convergence of the taking directions of the cameras, and recording an image of this registration marker on each individual picture. Since the center of convergence of the taking directions is the one point in the object field which does not change its position in the individual pictures, images of this point on the individual pictures should coincide in making the composite picture. Thus the images of the registration marker provide a means for accurately registering the individual pictures in making the composite picture therefrom. Suitable apparatus for doing this is described hereinafter. Ordinarily, the principal object being photographed is placed at the center of convergence of the taking directions.

My means of accomplishing the above objects may be more readily understood by having reference to the accompanying drawing, in which:

Fig. 1 is a side elevation of a suitable projector;

Fig. 2 is an original negative of one of the individual pictures;

Fig. 3 is an enlargement of the same;

Fig. 4 illustrates the use of a registration card; and

Fig. 5 shows a way of employing a film instead of plates in the projector.

In Figs. 1 to 4 I have shown means for projecting the individual pictures and forming a composite picture therefrom, and for obtaining correct registration during the projection. Here I employ a plumb line which is suspended above the subject's head, during the taking of the picture, at the center of the circle occupied by the cameras (not shown). This plumb line has a cross bar thereon, and the images of the plumb line and cross bar are indicated by numerals 35 and 36 in the drawing. Both plumb line and cross bar are located just high enough so as not to show in the space of the finished picture, but low enough to be photographed upon the end of each negative. As the plumb line is located at the center of the circle of the cameras, at the point of convergence of their taking directions, all the images 35 of it on the composite plate should coincide, and it is, therefore, a means of locating each negative in relation to the plate holder before each individual exposure of the composite is made. The small negative 50 shown in Fig. 2 is made first, and may be enlarged as shown in Fig. 3 to permit more convenient retouching. Either the original negatives or prints or enlargements thereof may be used in printing the composite picture.

In printing the composite picture, first number one negative is placed in the enlarging outfit or projector 40 with no attempt at registration of any kind. A piece of white material, such as a white card, 41 is placed in the focal plane that will later be occupied by the sensitized emulsion of the plate in the plate holder 37. The card 41 is located in a definite position on the laterally movable bed 43 of the projector by registering posts 42.

This white card 41 is larger than the plate holder 37 so the image of the plumb line 35 may be seen, as well as the subject matter to be printed. The movable bed is shifted around until the image of the part of the negative to be used is placed where it should be on the section of the card representing the plate holder.

Then, carefully, a pencil line is drawn on the card 41 over the image of the plumb line 35, taking care also to mark the point of crossing of the cross arm 36, as shown in Fig. 4. The card 41 is then replaced by the plate holder 37, which contains a photographic plate and a lineating screen on top thereof, and the first exposure of the photographically sensitive surface made. Negative number one is then replaced by number two and the photographic plate moved under the line screen the required amount by suitable mechanism in the plate holder. Ordinarily this movement should be so regulated that the width of the resulting band of strips printed through a single lineation will equal, or nearly equal, the distance between centers of two adjacent lineations. If desired, the line screen may be movable with respect to the photographic plate, instead of vice versa. Then the plate holder 37 is replaced by the registering card 41 and the movable bed 43 and the card 41 are moved around as a unit under the image until the pencil drawing of the plumb line 35 and cross arm 36 on the card coincide with their photographic image projected from the second negative. Then the plate holder 37 is put on the movable bed 43, in place of the card 41, and the second exposure of the recording surface made.

This process continues until all the negatives have been printed, and the sensitized positive plate has been moved under the lineating screen the distance between two adjacent lineations, or as near that as desired, during the printing procedure.

It may be desirable in some cases, to have the plumb line appear both above and below the object to be photographed, in which case a double exposure will have to be made, first, of the plumb line, and afterwards, of the object. This will produce a negative which when projected onto the registration card 41 would show an image of the plumb line 35 both above and below the subject. This method still further insures absolute accuracy of the registration for the strip images on the positive.

This process allows the use of almost any good enlarging apparatus and lens. Pleasing diffusion may be used to eliminate objectionable details either by means of a diffusion lens or disc, ground glass, silk, or other material. This method permits using a lens in the projector of larger aperture than any in the taking cameras, thereby shortening the time of exposure over that necessary when using the original cameras as projectors. It also eliminates the necessity of close registration of the plates in the plate holder in taking the original negatives, and the necessity of returning the negatives to exactly the same positions in the cameras for combining.

This procedure also allows the use of a roll film 44 as shown in Fig. 5 in taking the negatives, because the relation of the plumb line 35 to the subject would be the same in each negative, even if the film changed shape, as all the films would change to the same extent. The film would merely have to be stretched over the openings in the camera at the proper focal distance, the exposure made, the film developed as a unit, and later run through the enlarging machine or projector as seen in Fig. 5, without cutting the individual exposures apart.

This method of registration also makes a very convenient way to use any desired part of each negative enlarged or reduced to any extent.

Having described my invention what I regard as new and desire to secure by Letters Patent is:

1. The combination with a series of negatives exposed in a plurality of cameras arranged in the arc of a circle about the object to be photographed, each negative having an image of a plumb line above and below the object being photographed, and with a cross bar thereon suspended above the object being photographed, of a vertical projector, a movable bed thereon, a card for said bed adapted to receive the image on the negative in said projector, a plate holder, a sensitized plate in said holder, a line screen in front of said plate, and means to alter the relation of said screen to said plate.

2. The combination with a series of negatives exposed in a plurality of cameras arranged in the arc of a circle about the object to be photographed, each negative having an image of a plumb line with a cross bar thereon suspended above the object being photographed, of a vertical projector, a movable bed thereon, a card for said bed adapted to receive the image on the negative in said projector, a plate holder, a sensitized plate in said holder, a line screen in front of said plate, and means to alter the relation of said screen to said plate.

3. The combination with a series of negatives exposed in a plurality of cameras arranged in the arc of a circle about the object to be photographed, each negative having an image of a plumb line with a cross bar thereon suspended above the object being photographed, of a vertical projector, a movable bed thereon, a card for said bed adapted to receive the image on the negative in said projector, a registering corner on said bed engaged by said card, a plate holder, a sensitized plate in said holder, a line screen in front of said plate, and means to alter the relation of said screen to said plate.

4. Apparatus for the production of composite pictures for viewing in stereoscopic relief which comprises, in combination, a series of pictures taken in a plurality of cameras arranged in an arc about the principal object photographed, each picture having recorded thereon an image of a registration marker placed substantially at the position of the principal object photographed, projection means mounted on a support and adapted to project images of said pictures, a bed mounted on said support and relatively movable with respect to said projector, a plate holder containing a photographically sensitive surface, registering means on said bed adapted to hold said plate holder in position to receive and record said projected images, a lineating screen positioned between said sensitive surface and said projector and relatively movable with respect to said sensitive surface to expose separate interlineated areas thereof to separate projected images, and means interchangeable with said plate holder adapted to receive the images of the registration marker and enable said images to be registered in the same position with respect to the plate holder when the corresponding images of the pictures are recorded.

5. Apparatus for the production of composite pictures for viewing in stereoscopic relief which comprises, in combination, a series of pictures exposed in a plurality of cameras arranged in an arc about the principal object photographed, each picture having recorded thereon an image of a registration marker placed substantially at the position of the principal object photographed, a projector adapted to project images of said pictures, a plate holder containing a photographically sensitive surface positioned to receive and record said projected images, a lineating screen positioned between said sensitive surface and said projector and relatively movable with respect to said sensitive surface to expose separate interlineated areas thereof to separate projected images, and means to register the images of said registration marker in the same position with respect to the plate holder when the corresponding projected images are recorded.

6. Apparatus for the production of composite pictures for viewing in stereoscopic relief which comprises, in combination, a series of individual pictures of an object field taken from slightly different points of view, each picture having recorded thereon an image of a registration marker placed substantially at the position of the principal object being photographed, a projector adapted to project images of said individual pictures, a photographically sensitive surface positioned to receive and record said projected images, a lineating screen positioned between said projector and said sensitive surface adapted to expose separate interlineated areas of said sensitive surface to separate projected images, and means to register the images of said registration marker in the same position when the projected images are recorded.

7. Apparatus for the production of composite pictures for viewing in stereoscopic relief which comprises, in combination, a series of individual pictures of an object field taken from slightly different points of view, each picture having recorded thereon an image of a registration marker positioned in the object field substantially at the point of convergence of the taking directions, a projector adapted to project images of said individual pictures, a photographically sensitive surface positioned to receive and record said projected images, a lineating screen positioned between said projector and said sensitive surface adapted to expose separate interlineated areas of said sensitive surface to separate projected images, and means to register the images of said registration marker in the same position when the projected images are recorded.

8. Apparatus for the production of composite pictures for viewing in stereoscopic relief which comprises means for taking individual pictures of an object field from slightly different points of view, means for recording in fixed relationship with respect to each individual picture an image of a registration marker positioned substantially at the point of convergence of the taking directions, projection means mounted on a support and adapted to successively project images of said individual pictures, a plate holder containing a photographically sensitive surface positioned to receive and record said projected images, said plate holder being relatively movable laterally with respect to said projection means, a lineating screen positioned between said sensitive surface and said projection means and relatively movable with respect to said sensitive surface to expose slightly different interlineated areas thereof to the successive projected images, and means adapted to occupy substantially the position of said plate holder for receiving the images of the registration marker and enabling the registering of said images in successive superposed relationship as the successively projected images are recorded.

9. Apparatus for the production of composite pictures for viewing in stereoscopic relief which comprises means for taking individual pictures of an object field from slightly different points of view, means for recording in fixed relationship with respect to each individual picture an image of a registration marker positioned substantially at the point of convergence of the taking directions, projection means mounted on a support and adapted to successively project images of said individual pictures, a holder containing a photographically sensitive surface positioned to receive and record said projected images, means for changing the position of said projected images with respect to said sensitive surface, a lineating screen positioned between said sensitive surface and said projection means and relatively movable with respect to said sensitive surface to expose slightly different interlineated areas thereof to the successive projected images, and means for receiving the images of the registration marker and registering said images in successive superposed relationship as the successively projected images are recorded.

10. Apparatus for the production of composite pictures for viewing in stereoscopic relief which comprises means for taking individual pictures of an object field from slightly different points of view, means for recording in fixed relationship with respect to each individual picture an image of a registration marker positioned substantially at the point of convergence of the taking directions, projection means adapted to project images of said individual pictures, a photographically sensitive surface positioned to receive and record said projected images, lineating means positioned between said sensitive surface and said projection means adapted to expose slightly different interlineated areas of said sensitive surface to different projected images, and means to register the images of said registration marker in superposed relationship to enable the recording of said projected images in correct registered relationship.

11. Apparatus for the production of composite pictures for viewing in stereoscopic relief which comprises means for taking individual pictures of an object field from slightly different points of view, means for recording in fixed relationship with respect to each individual picture an image of a registration marker positioned substantially at the point of convergence of the taking directions, a recording surface, lineating means associated with said recording surface, means for printing said individual pictures through said lineating means onto slightly different interlineated areas of said recording surface, and means for registering the individual pictures during printing thereof so that the images of the registration marker coincide.

12. In the production of a composite stereoscopic picture from a series of individual pictures of an object field taken in a plurality of cameras arranged in an arc of a circle about the principal object photographed, the improvement which comprises placing a registration marker in the object field substantially at the center of said circle, recording an image of said registration marker on each of said individual pictures, successively projecting images of said individual pictures through a lineating screen onto a photographically sensitive surface, moving said lineating screen and said sensitive surface relative to each other to expose slightly different interlineated areas of the sensitive surface to the successively projected images, and registering the images of said registration marker in successive superposed relationship as the successively projected images are recorded.

13. In the production of a composite stereoscopic picture from a series of individual pictures of an object field taken in a plurality of cameras arranged in an arc of a circle about the principal object photographed, the improvement which comprises placing a registration marker in the object field substantially at the center of said circle, recording an image of said registration marker on each of said individual pictures, projecting said individual pictures through a lineating screen onto slightly different interlineated areas of a photographically sensitive surface, and registering the images of said individual pictures during projection thereof by superposing the images of said registration marker.

14. In the production of a composite stereoscopic picture from a series of individual pictures of an object field taken from a plurality of slightly different points of view, the improvement which comprises positioning a registration marker in the object field substantially at the point of convergence of the taking directions, recording an image of said registration marker on each of said individual pictures, printing said individual pictures through a lineating screen onto slightly different interlineated areas of a recording surface, and registering the individual pictures during printing thereof so that the images of the registration marker coincide.

ERNEST E. DRAPER.